Figure 1:
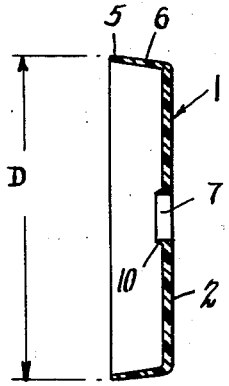

Nov. 4, 1958  A. W. JACOBS  2,859,078
CUP PACKING
Filed Feb. 12, 1954

INVENTOR.
ARTHUR W. JACOBS
BY
Oberlin & Limbach
ATTORNEYS.

United States Patent Office 2,859,078
Patented Nov. 4, 1958

2,859,078

CUP PACKING

Arthur W. Jacobs, Berea, Ohio

Application February 12, 1954, Serial No. 409,920

2 Claims. (Cl. 309—23)

The present invention relates generally as indicated to a cup packing and more particularly to a cup packing of the type which is adapted to form a sliding seal between a reciprocating piston and a cylinder, for example.

Cup packings are well known in the art, but hitherto they have been made, almost exclusively, of leather, and in a few instances, of rubbery materials such as neoprene. Leather cup packings, if used in connection with pneumatic cylinders or pumps, are apt to dry out and crumble and soon lose their effectiveness as a sliding seal. Likewise, even when leather cup packings are employed in oil or other liquid cylinders, the leather becomes saturated and some leakage will occur through the leather itself. Moreover, because leather is structurally weak and flabby and especially so when saturated with oil, an intermediate support member must be used between paired, oppositely facing packings. Said support member must either be radially spaced from the cylinder bore to prevent scoring of the latter by said member; or, if no such clearance is provided, said member then must have a facing of relatively soft material to prevent such scoring of the cylinder wall. In instances where such clearance is provided around the periphery of said member, high fluid pressures will cause the structurally weak and flabby leather cups to be wedged in between the cylinder wall and the periphery of said support member with the result that the peripheral flanges of the cups may be sheared off at such clearance or pieces of the leather will be snipped off, thereby rendering the leather cup packings useless in the establishment of a sliding seal between the piston and the cylinder.

Another serious disadvantage in leather cup packings is the difficulty of preventing leakage of fluid between the piston rod and the packings from one side to the other of the piston.

In view of the foregoing shortcomings of leather cup packings and synthetic rubber or like cup packings, as well, it is one principal object of this invention to provide a cup packing which eliminates these difficulties by reason of several important factors; namely, that the cup packing herein is molded from nylon which has toughness, form stability, abrasion resistance, impact resistance, high heat resistance, great tensile strength, low co-efficient of friction for oil-less operation, durability, and resilience and other desirable properties which make it admirably suitable for cup packings.

Another object is to provide a cup packing as aforesaid which does not require any intermediate spacer and support member as is required in piston packings using leather or synthetic rubber cup packings.

Another object is to provide a cup packing which has a definite cylindrical bearing surface in sliding contact with the cylinder to form a fluid-tight sliding seal, said cylindrical surface being normally of a diameter slightly larger than that of the cylinder bore whereby said surface is in resilient engagement with such bore.

Another object is to provide a cup packing which is capable of being molded directly from nylon molding powder, granules, or flakes, and requires no special finishing operations after removal thereof from the mold.

Another object is to provide a cup packing which is so formed that a fluid-tight seal is assured where the piston rod passes through the central opening of the cup packing.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of a few of the various ways in which the principle of the invention may be employed.

Figure 2:
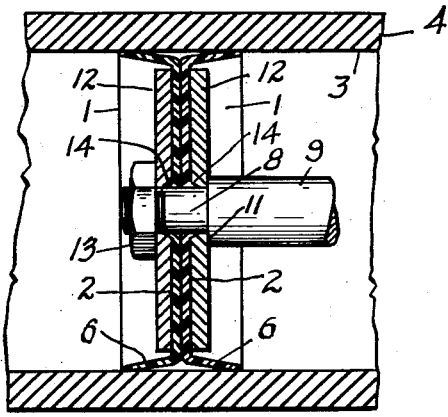
Figure 3:
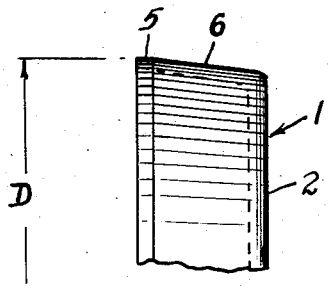

In said annexed drawing:

Fig. 1 is a cross-section view diametrically through a preferred form of the cup packing constituting the present invention;

Fig. 2 is a cross-section view diametrically through a fluid cylinder in which the piston packing comprises two of the present cup packings arranged in back-to-back relation to form an efficient seal against passage of pressure from either side of the piston to the opposite side; and Fig. 3 is a fragmentary elevation view on a somewhat enlarged scale to more clearly show the definite cylindrical bearing surface around the periphery of the present cup packing.

Referring now in greater detail to the drawing, the cup packing 1 shown therein is preferably molded from nylon. Specifically, nylon molding material FM–3001 has been found to have the desired properties.

In one particular form of the cup packing 1 for 2½-inch diameter cylinders, the bottom wall 2 of the cup packing was of .070" thickness, and the outside diameter D of the cup packing 1 as molded was .030" larger in diameter than the bore 3 of the cylinder 4 with which the cup packing was to have resilient sliding contact.

The cylindrical bearing surface 5 of said cup packing 1 was approximately 1/16" long in an axial direction, and therefrom the skirt or side 6 of the cup was tapered at an angle of approximately 7°, the thickness of said skirt 6 being about .040".

The central opening 7 through the cup packing 1 is of approximately the same diameter as that of the reduced end portion 8 of the piston rod 9; however, a slight clearance is usually provided so as to avoid lateral stresses on the piston rod 9 owing to misalignment of the axes of bore 3 and piston rod 9. Projecting from the bottom wall 2 and surrounding such opening 7 is a lip 10 which preferably tapers as shown at an angle of about 30° to a feather edge.

As shown in Fig. 2, the reduced end portion 8 of piston rod 9 forms a shoulder 11 for a washer 12, and on such reduced end portion 8, are mounted two packing cups 1—1 in back-to-back relation as shown. Another washer 12 is then slipped onto the reduced end portion 8, and a nut 13 threaded onto the end portion 8 serves to tightly clamp the packing cups 1—1 between the washers 12—12. It is to be noted that each washer 12 has a chamfered bore 14 preferably of slightly smaller diameter than the tapered lip 10 of the respective packing cup 1 so that when said nut 13 is tightened as aforesaid, said lips 10 will be radially contracted tightly about the reduced end portion 8 of the piston rod 9 to thus form fluid-tight seals to prevent leakage of fluid from one side to the other of the piston as defined by washers 12—12.

and cups 1—1. The washers 12—12 are preferably of diameter substantially equal to the inside diameter of the bottom wall 2 of the respective cups.

Because said cups 1—1 are molded from nylon, it is unnecessary to provide a supporting washer between the packing cups and thus there is no danger of scoring of the cylinder bore 3. Even under high pressure conditions of use, the high strength of the nylon cups prevents shearing of the unsupported bottom walls 2 adjacent the junctions thereof with skirts 6. In ordinary cup packings of leather or synthetic rubber, these outer portions of the bottom walls must be backed up with intermediate metal washers to impart shear resistance at these areas.

As aforesaid, the cylindrical bearing portions 5 of the packing cups 1 are slightly larger than the diameter of the bore 3 of the cylinder 4; and, therefore, when the piston composed of washers 12 and cups 1 is inserted into the cylinder 4, there will be a resilient contact between said bearing surfaces 5 and the cylinder bore 3 which will establish a fluid-tight seal. Furthermore, the employment of nylon for the molding of these cups 1 makes it unnecessary to employ any lubricants even in the case of pneumatic cylinders or other devices which employ air or other non-lubricating fluids, the static coefficient of friction of nylon against polished steel being less than 0.15 and the dynamic coefficient being as low as 0.04. As previously listed, nylon has a number of desirable characteristics which make it especially useful as a packing cup of the character described herein. Another notable feature is that nylon does not "load" abrasive as does leather and like materials.

Other modes of applying the principle of the invention may be employed, change being made as regards the details described, provided the features stated in any of the following claims, or the equivalent of such, be employed.

I therefore particularly point out and distinctly claim as my invention:

1. A cup packing for pistons comprising a cup-shaped member molded of a horny plastic material having approximately the strength, modulus of elasticity, toughness, resilience, and hardness of nylon, said member having a relatively thick and inflexible bottom wall which has a central opening through which a piston rod is adapted to project and a relatively thinner and flexible annular skirt around the periphery of said wall which tapers from said wall to larger diameter at its end for resilient contact of only a portion of the axial length of said skirt within a cylinder bore to provide a low friction sliding seal, said wall, at the margin of such opening, including a short axially extending flexible lip which is of tapered cross-section terminating in a feather edge and which is adapted to be radially contracted to establish a fluid-tight seal around such piston rod.

2. A piston for fluid cylinders comprising a piston rod having a reduced end portion providing a shoulder, a pair of washers on such portion one of which is adjacent to such shoulder, a pair of oppositely facing cup packings on such portion and disposed between said washers, each cup packing being molded of a horny plastic material having approximately the strength, modulus of elasticity, toughness, resilience and hardness of nylon and having a relatively thick and inflexible bottom wall which has a central opening through which such reduced end portion extends and a relatively thinner and flexible annular skirt around the periphery of said wall which tapers from said wall to larger diameter at its end for resilient contact of only a portion of the axial length of said skirt within a cylinder bore to provide a low friction sliding seal, and means on the reduced end portion of said piston rod for clamping said packings directly back-to-back with said skirts extending in opposite directions, said packings having oppositely disposed short axially extending lips around such central openings which are of tapered cross-section terminating in feather edges, and said washers having wedge surfaces operative to radially contract said lips into fluid-tight contact around such reduced end portion upon clamping of said packings between said washers.

References Cited in the file of this patent

UNITED STATES PATENTS

| | | |
|---|---|---|
| 612,687 | Van der Bosch | Oct. 18, 1898 |
| 1,118,963 | Stage | Dec. 1, 1914 |
| 1,356,032 | Angus | Oct. 19, 1920 |
| 1,762,602 | Wideman | June 10, 1930 |
| 1,820,269 | Craig | Aug. 25, 1931 |
| 2,509,436 | Isenbarger | May 30, 1950 |
| 2,565,701 | Stewart | Aug. 28, 1951 |
| 2,665,179 | Salvatora | Jan. 5, 1954 |
| 2,733,969 | Polk | Feb. 7, 1956 |

FOREIGN PATENTS

| | | |
|---|---|---|
| 620,864 | France | Jan. 25, 1927 |
| 1,038,099 | France | Sept. 24, 1953 |